Nov. 25, 1958   H. CHANSLOR   2,861,367
CHILD'S FOOD DISH
Filed Oct. 7, 1955
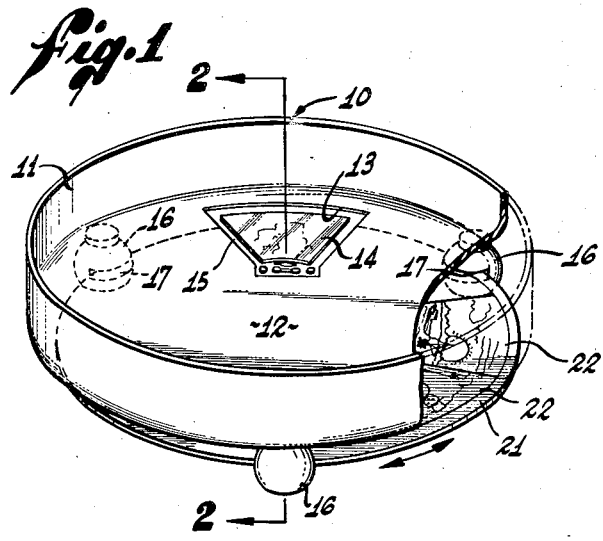
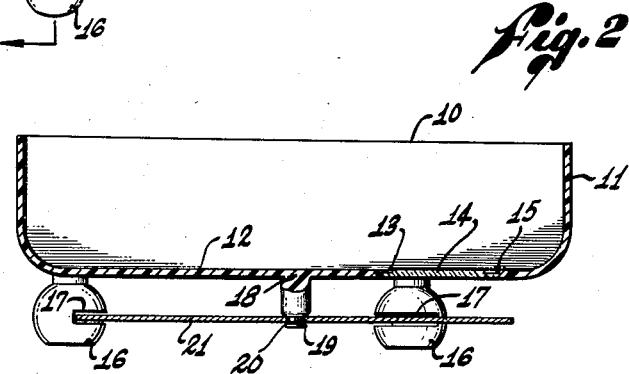
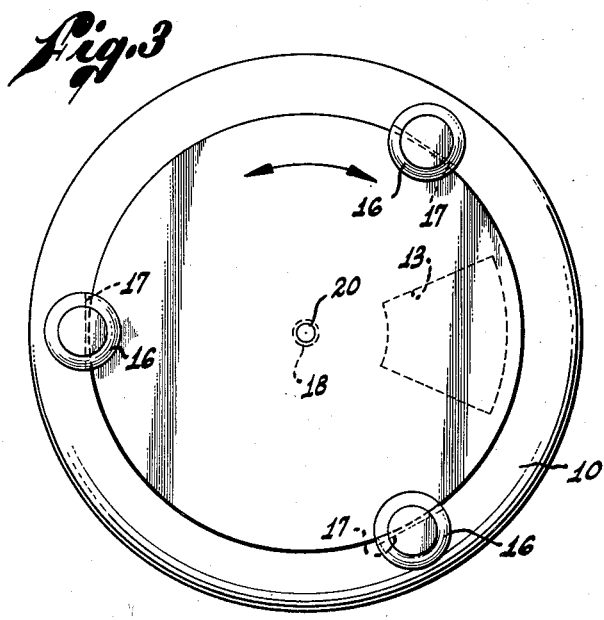
INVENTOR.
HAL CHANSLOR
BY
ATTORNEY

United States Patent Office 2,861,367
Patented Nov. 25, 1958

2,861,367

CHILD'S FOOD DISH

Hal Chanslor, Sunset Beach, Calif.

Application October 7, 1955, Serial No. 539,087

3 Claims. (Cl. 40—70)

This invention relates generally to eating utensils and more particularly to a child's food dish.

A primary object of the invention is the provision of a child's food dish which affords inducement to the child to finish his meal.

Another object of the invention is the provision of a novel child's eating dish which embodies pictures that may be viewed only after the dish has been emptied.

Yet another object of the invention is the provision of a child's eating dish wherein a series of pictures may be brought to view through a transparent window in the bottom of the dish by manipulation of a picture disk rotatably mounted on the under side of the dish.

A further object of the invention is the provision of an eating dish for children embodying novel means for interchangeably supporting a picture disk at the under side of the dish, the individual pictures of which may be brought to view through a transparent window in the bottom of the dish.

The invention may be best understood from the following detailed description thereof taken in conjunction with the annexed drawings wherein:

Figure 1 is a perspective view of the present eating dish with a part thereof broken away for the sake of clarity;

Figure 2 is a section taken along line 2—2 of Figure 1;

Figure 3 is a bottom plan view of the present eating dish; and

Figure 4 is a view, on reduced scale, of a picture disk for use in the present dish.

Referring now to the drawings, the present dish comprises a bowl-shaped member 10, of plastic or other suitable material, having an annular rim 11 and a generally flat bottom 12. Bottom wall 12 is, adjacent its periphery, formed with an angular opening 13 in which is cemented, or otherwise suitably affixed, a transparent window 14, the remainder of the dish being entirely opaque. Transparent window 14 may be embossed to simulate the face and control panel of a television set, as indicated at 15, or if desired, the bottom 12 of the bowl may be suitably embossed about the opening 13 in lieu of embossing the window.

Extending from the under side of the bottom wall 12 of the dish are three equiangularly spaced supporting legs 16 of generally spherical configuration and having flattened bottom portions for resting on a horizontal surface. These supporting legs 16 are adjacent the outer periphery of the dish and are coplanarly slotted at 17 in a plane parallel to and spaced a substantial distance below the bottom wall 12. Depending from the underside of bottom wall 12 in coaxial relationship with the bowl 10 is a cylindrical stud 18 whose free end is somewhat reduced in diameter at 19, the shoulder formed at the juncture of the reduced portion 19 with the cylindrical portion 18 being disposed substantially in the plane of the upper side walls of the slots 17 in the legs 16. The reduced portion 19 of the stud 18 is formed with a slightly enlarged annular lip 20.

Indicated at 21 is a disk of cardboard or other suitable material of a thickness to be slidably received in the slots 17 of the legs 16. As shown in Figure 4, at least one face of the disk 21 has a series of pictures 22 pasted or printed thereon. The shape and size of each of the picture portions 22 conform substantially to the shape and size of the transparent window 14 in the bottom wall 12 of the dish. Disk 21 is centrally apertured at 22 and is adapted to be positioned on the dish with the reduced portion 19 of the stud 18 extending through the central aperture 22 therein and with the peripheral edge of the disk extending into the slots 17 in the supporting legs of the dish. The flexibility of the material from which the disk is made permits flexing of the latter sufficiently to permit positioning thereof on the dish in the manner above described. The annular lip 20 on the stud 18 serves to retain the disk against accidental movement off the stud 18. The picture portions 22 are radially spaced from the central aperture 21 in the disk to correspond with radial spacing between the transparent window 14 and the stud 18 so that the disk 21 may be rotated to successively bring the picture portions 22 into registry with the window 14 so as to be visible through the latter when the dish 10 is empty. The spacing of the disk 21 from the bottom wall 12 of the bowl and from the flattened bottom portions of the supporting legs 16 is such as to permit the peripheral edge of the disk to be engaged by the fingers of a child or parent so that the disk may be turned to view each of the pictures thereon.

While a preferred form of the invention has been described and illustrated, it will be apparent that numerous modifications in design and arrangement of parts are possible within the scope of the following claims.

I claim:

1. A child's eating dish comprising: a bowl portion of relatively opaque material, a transparent window in the bottom wall of said bowl portion, at least three supporting legs fixed to the under side of said bottom wall for supporting the bowl portion on a horizontal surface with the bottom wall spaced from said surface, said legs being slotted on their inner sides in a plane parallel to and spaced below said bottom wall, a pin fixed to the under side of said bottom wall and depending therefrom in coaxial relationship with the bowl portion, and a centrally apertured picture disk containing a series of pictures mounted on the under side of said bottom wall with the pin extending through the aperture in the disk and the peripheral edge of the latter extending into said slots whereby the disk is rotatably mounted on the bowl for rotation thereof to bring the series of pictures thereon successively into view through said transparent window.

2. The subject matter of claim 1 wherein said pin has a downwardly facing shoulder against which said disk is adapted to abut, the free end of said pin being slightly enlarged to retain said disk on the pin.

3. A child's eating dish comprising a bowl of opaque material having a bottom wall, a transparent window in said wall, three supporting legs fixed to the underside of said wall in approximately equally spaced relationship to a common point located approximately at the center of said bottom wall whereby said legs are located approximately on a common circle, said legs being generally uniformly circumferentially spaced about said circle and having their radially inner sides slotted in a common plane substantially parallel to and spaced a distance below said wall, a disc having its peripheral edge slideably received in said slots, said disc being adapted to contain a series of circumferentially spaced pictures to be successively brought into view through said window by rotation of the disc, and the upper walls of said slots being spaced below said bottom wall whereby the disc is retained in spaced relationship to said bottom wall for facility of rotating the disc.

References Cited in the file of this patent

UNITED STATES PATENTS

| 104,859 | Lawrence | June 28, 1870 |
| 222,594 | Marra | Dec. 16, 1879 |
| 2,156,351 | Paul | May 2, 1939 |
| 2,178,812 | Schade | Nov. 7, 1939 |
| 2,200,696 | L'Heureux | May 14, 1940 |
| 2,514,094 | Rubin | July 4, 1950 |
| 2,781,650 | Lee | Feb. 19, 1957 |